United States Patent [19]

Quinn et al.

[11] Patent Number: 4,472,449

[45] Date of Patent: Sep. 18, 1984

[54] CORN FLAKE PROCESS AND PRODUCT

[75] Inventors: Ann M. Quinn, Marshall; Hugh L. Trenk, Augusta; Ignatius S. Cuyjet, III, Climax, all of Mich.; Reuben H. Waitman, Pearl River, N.Y.

[73] Assignee: General Foods Corporation, White Plains, N.Y.

[21] Appl. No.: 353,292

[22] Filed: Mar. 1, 1982

[51] Int. Cl.³ .............................................. A23L 1/164
[52] U.S. Cl. .................................... 426/621; 426/466; 426/457
[58] Field of Search .............................. 426/619–621, 426/625, 626, 466, 450, 457

[56] References Cited

U.S. PATENT DOCUMENTS 3,484,250 12/1969 Vollink et al. ...................... 426/621
3,505,078 4/1970 Hreschak ............................ 426/619

FOREIGN PATENT DOCUMENTS 618524 2/1949 United Kingdom ................ 426/621

Primary Examiner—Raymond N. Jones
Assistant Examiner—Elizabeth A. Hatcher
Attorney, Agent, or Firm—Thomas R. Savoie; Daniel J. Donovan; Sam D. Walker

[57] ABSTRACT

A process for making crisp corn flakes wherein the corn is cooked at a slightly alkaline pH, processed at a high moisture, or a combination of these steps.

14 Claims, No Drawings

CORN FLAKE PROCESS AND PRODUCT

FIELD OF INVENTION

This invention relates to processing cereal materials into a ready-to-eat cereal product. More particularly, it relates to a process for making a corn flake which resists milk sogginess longer than current production corn flakes.

DESCRIPTION OF THE PRIOR ART

In the prior art, corn flakes have typically been made by cooking a form of corn—such as corn meal, corn grits, or corn flour—drying, flaking and then toasting the resulting flakes. Improvements have been made by cooking the corn then extruding into pellets before flaking, U.S. Pat. No. 3,620,657 issued to Vollink, and by plasticizing the cooked and dried corn in a hot, humid atmosphere before flaking, U.S. Pat. No. 4,013,802 issued to Reesman.

While cooking corn in alkali is a traditional step in corn processing, the corn for corn flakes is processed at an acidic pH. U.S. Pat. No. 3,083,103 issued to Anderson et al. describes the traditional use of alkali in corn processing. The alkali processing of corn is typically used to make products such as tortilla dough and corn snacks where the "lime" flavor is traditionally associated with the product. In this use, while other alkalis are acceptable, lime should be a substantial portion of the alkali used. To achieve this "lime" taste, the Anderson patent suggests that a pH of at least 8.5 should be used in the process. However, a "lime" taste is considered undesirable in corn flakes.

SUMMARY OF THE INVENTION

This invention comprises a process that produces corn flakes with improved textural properties. Critical among the improved textural properties, is the fact that these corn flakes are more resistant to becoming soggy. Consequently, the corn flakes produced by the instant invention stay crisp longer, after milk addition, than current corn flakes. The process for producing these corn flakes begins with cooking the corn at a slightly alkaline pH, in contrast to the prior art, which uses an unaltered pH. The unaltered cooking pH for corn flakes is between 5.0 to 5.5. The cooked corn is then dried, however, the corn in the instant invention is not dried as thoroughly as prior art directs. Rather, during the tempering, reheating, and flaking, the corn is processed at a higher moisture. This corn is then flaked, and oven toasted to produce a corn flake with a specified bulk density.

DETAILED DESCRIPTION OF THE INVENTION

The process for making the crispier corn flakes which are the product of this invention begins with cooking corn in a syrup that may include salt, sugar, malt syrup, corn syrup, water, and ferrous sulfate. More particularly the syrup is comprised of 6–8% salt, 15–22% sugar, 0–10% malt syrup, 0–8% corn syrup, 60–75% water, and 0–0.1% ferrous sulfate. Before mixing the syrup with the corn, the syrup's pH is made alkaline. Any alkali is used to adjust the syrups' pH to between 7 and 9.5. It is preferred that the alkali be a food-grade alkali such as the hydroxides, carbonates, bicarbonates, and phosphates of alkali and alkaline-earth metals and it is more preferred that the alkali be either sodium hydroxide, calcium hydroxide, or potassium hydroxide. Furthermore, pH adjustment of the cook syrup to between 7.1 and 8.45 is preferred with the pH range of 7.25 to 8.25 being more preferred. Corn and syrup are combined in a corn pressure cooker in the ratio of between 70–80% corn and 20–30% syrup. This combination is cooked for between $1\frac{1}{4}$ and $2\frac{3}{4}$ hours at between $1.24 \times 10^6$ and $1.72 \times 10^6$ dynes per square centimeter.

After cooking, the corn is dried to a moisture between 15 and 25%. However, a moisture between 16 and 23% is preferred and the moisture range of 18 to 22% is most preferred. Next, the corn is tempered at an ambient or higher temperature, preferably between 20° C. and 50° C., for from 2 to 24 hours at a relative humidity between 50 and 99%. After tempering, the corn is heated to between 57° C. and 121° C. Nevertheless, heating the corn to a temperature of less than 93° C. is preferred with an upper temperature limit of 82° C. being more preferred. The heated corn is then flaked to a bulk density between 86 and 114 grams per liter. Preferably, the flake density is between 89 and 105 grams per liter. These flakes are then toasted at between 176° and 288° C. for 30 to 90 seconds.

EXAMPLE 1

To prepare the improved corn flakes, 16.3 kilograms of corn grits were added to a small rotary cooker. Also added to the cooker was 6.35 kilograms of an aqueous cook syrup containing: 0.38 kilograms of salt; 1.08 kilograms of sugar; 0.51 kilograms of 80% solids, malt syrup; and 0.64 grams of ferrous sulfate in 4.38 kilograms of water. However, before the cook syrup is added, the pH of the cook syrup was adjusted to 8.0 with calcium hydroxide and the syrup was well mixed. After the syrup had been added, the rotary cooker was closed and tumbled for 7 minutes. The corn was then cooked for 2 hours at $1.38 \times 10^6$ dynes per square centimeter. After cooking, the corn was removed from the cooker and dried in a 121° C. oven for 25 minutes reducing the moisture to 19%. The cooked dried grits was allowed to temper for 16 hours, after which, it was reheated to 65° C. before flaking. These preheated corn grits were then transported to a rolling mill where they were flaked to a density of 96 grams per liter. The flaked corn was then toasted in a rotary oven for 30 to 45 seconds at approximately 288° C. This product was then cooled and packaged.

EXAMPLE 2

Corn flakes were produced according to the procedure outlined in Example 1, except that the pH of the cook syrup was not adjusted. Consequently, the cook syrup pH of Example 2 was about 5.5.

EXAMPLE 3

Corn flakes were produced according to procedure outlined in Example 1, except that the cooked grits were dried to a moisture of 13% before tempering.

Table 1 shows the results of an expert taste panel evaluation of corn flakes produced according to Examples 1, 2 and 3 and commercial corn flakes. This expert taste panel recorded the time required for the corn flakes to be rated by the panel as soggy after they were wetted with milk. Example 1 corn flakes remained crisp for 1.8 times the commercial corn flakes' crispness duration. Corn flakes produced according to Example 2 stayed crisp for 1.6 times as long as commercial corn flakes and Example 3 corn flakes remained crisp for 1.3 times as long as commercial corn flakes.

TABLE 1

| Example | pH | Percent Pre-Flaking Moisture | Time-texture Ratio |
|---|---|---|---|
| 1 | 8.0 | 19 | 1.8 |
| 2 | 5.5 | 19 | 1.6 |
| 3 | 8.0 | 13 | 1.3 |

The time-texture ratio in Table 1 is the ratio of the length of time required for the experimental corn flakes to become soggy once milk was added to the corresponding time for a popular commercial corn flake.

It is also within the scope of this invention to apply these principals to the process of making corn flakes by pelletizing. More specifically, it is envisoned that one practicing the instant invention in a pelletizing process would adjust the pH of the cooking mixture in either a continuous cooker or a cooker-extruder before forming the corn pellets for flaking. Alternatively, one practicing this invention might process the corn pellets at a higher moisture than the prior art practioner would use, or adjusting the pH of the cook syrup and process the corn pellets at the higher moisture.

What is claimed:
1. A process for making corn flakes comprising:
   (1) adjusting the pH of a cook syrup to between 7 and 9.5;
   (2) cooking corn in said cook syrup;
   (3) drying the corn to a moisture of 15 to 25%;
   (4) tempering the corn for 2 to 24 hours;
   (5) heating the corn to 57° C. to 121° C. before flaking;
   (6) flaking to 86 to 114 grams per liter bulk density; and
   (7) oven toasting.
2. A corn flake prepared by the process of claim 1.
3. A process according to claim 1 where the cook syrup is adjusted to a pH between 7.1 and 8.45.
4. A process according to claim 1 where the cook syrup is adjusted to a pH between 7.25 and 8.25.
5. A process according to claim 1 where the corn is flaked to a bulk density between 89 and 105 grams per liter.
6. A process according to claim 1 where the corn is heated after tempering at between 57° to 93° C.
7. A process according to claim 1 where the corn is heated after tempering at between 57° to 82° C.
8. A process according to claim 1 wherein the corn is dried to a moisture between 16 and 23 percent.
9. A process according to claim 1 wherein the corn is dried to a moisture between 18 and 22 percent.
10. A process according to claim 1 where the pH of the cook syrup is adjusted by the use of any food grade alkali.
11. A process according to claim 10 wherein the food grade alkali is chosen from the group consisting of hydroxides, carbonates, bicarbonates, and phosphates of the alkali and alkaline-earth metals and combinations thereof.
12. A process according to claim 10 wherein the food grade alkali is chosen from the group consisting of calcium hydroxide, sodium hydroxide, and potassium hydroxide, and combinations thereof.
13. A corn flake prepared by the process of claim 12.
14. A process according to claim 1 which further comprises:
   combining said corn with said cook syrup in a ratio of between 70–80% corn and 20–30% syrup.

* * * * *